United States Patent
Yun et al.

(10) Patent No.: US 6,738,121 B2
(45) Date of Patent: May 18, 2004

(54) TAPE CARRIER PACKAGE WITH DUMMY BENDING PART AND LIQUID CRYSTAL DISPLAY EMPLOYING THE SAME

(75) Inventors: Sai Chang Yun, Kumi-shi (KR); Eun Yeong An, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 277 days.

(21) Appl. No.: 09/814,828

(22) Filed: Mar. 23, 2001

(65) Prior Publication Data

US 2001/0035930 A1 Nov. 1, 2001

(30) Foreign Application Priority Data

Mar. 31, 2000 (KR) .................................. P2000-17026

(51) Int. Cl.[7] ............................................. G02F 1/1345
(52) U.S. Cl. .................... 349/149; 349/150; 349/151; 349/152
(58) Field of Search ........................ 349/149, 150

(56) References Cited

U.S. PATENT DOCUMENTS

| | | | | |
|---|---|---|---|---|
| 4,287,525 A | * | 9/1981 | Tagawa | 347/148 |
| 4,474,432 A | * | 10/1984 | Takamatsu et al. | 349/150 |
| 5,362,547 A | * | 11/1994 | Yamazaki | 428/167 |
| 5,398,128 A | * | 3/1995 | Tajima et al. | 349/150 |
| 5,528,403 A | * | 6/1996 | Kawaguchi et al. | 349/149 |
| 5,668,700 A | * | 9/1997 | Tagusa et al. | 361/779 |
| 5,670,994 A | * | 9/1997 | Kawaguchi et al. | 345/206 |
| 6,104,464 A | * | 8/2000 | Adachi et al. | 349/150 |

FOREIGN PATENT DOCUMENTS

| JP | 404304427 A | * | 10/1992 |
|---|---|---|---|
| JP | 11271795 | | 10/1999 |

\* cited by examiner

*Primary Examiner*—John F. Niebling
*Assistant Examiner*—Angel Roman
(74) *Attorney, Agent, or Firm*—McKenna Long & Aldridge LLP

(57) ABSTRACT

A tape carrier package has dummy bending parts that are capable of reducing a brightness difference of a screen. In the tape carrier package, a pad part is connected to a liquid crystal panel. A base film is mounted with an integrated circuit chip for applying a signal to the liquid crystal panel. A dummy bending part is formed by removing the base film between the pad part and the integrated circuit chip to distribute a stress applied to the liquid crystal panel according to a thermal expansion of the pad part.

15 Claims, 7 Drawing Sheets

TAPE CARRIER PACKAGE WITH DUMMY BENDING PART AND LIQUID CRYSTAL DISPLAY EMPLOYING THE SAME

This application claims the benefit of Korean Patent Application No. P2000-17026, filed on Mar. 31, 2000, which is hereby incorporated by reference for all purposes as if fully set forth herein.

BACKGROUND OF THE INVENTION

1. Field of the Invention

This invention relates to an apparatus for mounting an integrated circuit on a liquid crystal display, and more particularly to a tape carrier package with a dummy bending part that is capable of reducing a difference in brightness in a screen. Also, the present invention is directed to a liquid crystal display that is capable of reducing a difference in brightness, using said tape carrier package.

2. Description of the Related Art

Generally, a liquid crystal display with an active matrix driving system uses thin film transistors (TFTs) as switching devices to display a natural moving picture. Since such a liquid crystal display can be made into a smaller-size device than the Brown tube, it is commercially available for a monitor such as a portable television or a lap-top personal computer, etc.

The active matrix liquid crystal display displays a picture corresponding to video signals, such as television signals, on a pixel (or picture element) matrix having pixels arranged at each intersection between gate lines and data lines. Each pixel includes a liquid crystal cell for controlling a transmitted light quantity in accordance with a voltage level of a data signal from a data line. The TFT is installed at an intersection between the gate line and the data line to switch a data signal to be transferred to the liquid crystal cell in response to a scanning signal (i.e., a gate pulse) from the gate line.

Such a liquid crystal display requires a number of driving integrated circuits, each hereinafter referred to as a "D-IC", connected to the data lines and the gate lines to apply data signals and scanning signals to the data lines and the gate lines, respectively. The D-ICs are installed between the printed circuit board (PCB) and the liquid crystal panel to apply the data signals and the scanning signals to the data lines and the gate lines of the liquid crystal panel in response to a control signal applied from the PCB. A tape automated bonding (TAB) system has generally been used as a mounting method of the D-ICs that is capable of widening an effective area of the panel and has a relatively simple mounting process.

The TAB method may be divided into a bending type as shown in FIG. 1A, and a flat type as shown in FIG. 1B. The bending-type TAB system as shown in FIG. 1A has been used for a mounting of source and gate drivers of a monitor or a notebook computer. In the bending-type TAB system, a PCB 6 is folded to the rear side of a liquid crystal panel 2 by bending a tape carrier package (TCP) 10 mounted with a D-IC 8 and connected between a lower glass substrate 3 of the liquid crystal panel 2 and the PCB 6. A backlight unit 4 is positioned below the liquid crystal display panel 2. As shown in FIG. 2 and FIG. 3, an adhesive 25 is coated on a base film 24 of the TCP 10, and a lead part 26 is adhered thereon. The lead part 26 made from copper (Cu) is connected to pins of the D-IC 8. On the lead 26 is coated a solder resistor 27 responsible for providing an insulator. At the upper end and the lower end of the base film 24, an input pad part 21 and an output pad part 22 extending from each lead of the lead part 26 are provided. The input pad part 21 is connected to an output signal wiring of the PCB while the output pad part 22 is connected to the gate line or the data line formed on a lower glass substrate 3. Bending parts 10a and 10b are provided between the input pad part 21 and the D-IC 8 and between the output pad part 22 and the D-IC 8, respectively. The base film 24 is removed from the bending parts 10a and 10b. The TCP 10 is easily bent with the aid of these bending parts 10a and 10b.

The flat-type TAB system as shown in FIG. 1B is mainly used to mount gate drivers of a 10.4" or 12.1" small-size notebook computer or monitor. In the flat-type TAB system, a TCP 12 mounted with a D-IC 8 and connected between a lower glass substrate 3 of a liquid crystal panel 2 and a PCB 6 is arranged in parallel to the liquid crystal panel 2. Thus, since the TCP 12 connected between the liquid crystal panel 2 and the PCB 6 is not bent, no bending part is formed.

However, the conventional TAB system has a problem in that a brightness difference is generated between an area where the TCP 10 or 12 is adhered onto the liquid crystal panel 2 and an area where the TCP 10 or 12 is not adhered onto the liquid crystal panel 2. More specifically, as shown in FIG. 4, the TCPs 10c to 10j are adhered to the edge of the lower glass substrate 3 at a desired spacing, having an anisotropic conductive film (ACF) therebetween under a high temperature and high pressure atmosphere. At this time, the TCPs 10c to 10j are expanded by heat and then contracted while the heat applied thereto is lowered to a normal temperature after their adhesion. A stress is applied to the lower glass substrate 3 by such TCPs 10c to 10j. As a result, since the lower glass substrate 3 is deformed into a periodical land/groove shape as shown in FIG. 5, a cell gap between an upper glass substrate (not shown) and the lower glass substrate 3 has a periodical thickness difference. When an experiment using the gray patterns of '7' and '3' was made with respect to two samples of a 12.1" liquid crystal panel as shown in FIG. 4 having SVGA resolution (i.e., 800×600) and a brightness of 300 nit, a brightness difference is periodically generated. As a result of this experiment, a brightness difference between the adhesive areas a, c, e, g, i and k and the non-adhesive areas b, d, f, h and i of the TCPs 10c to 10j having a difference in the cell gap is indicated in the following Table 1, and in FIGS. 6 and 7. As a brightness measuring device, a 'PR800' model optical measuring-set is used for sensing a brightness level in accordance with a received light amount.

TABLE 1

| Sample | Measuring Point | a | b | c | d | e | f | g | h | i | j | k |
|---|---|---|---|---|---|---|---|---|---|---|---|---|
| Sample 1 | 7-Gray | 0.577 | 0.74 | 0.679 | 0.879 | 0.818 | 0.956 | 0.801 | 0.959 | 0.829 | 0.957 | 0.794 |
|  | 3-Gray | 0.44 | 0.538 | 0.491 | 0.642 | 0.577 | 0.703 | 0.584 | 0.707 | 0.604 | 0.712 | 0.596 |

TABLE 1-continued

| Sample | Measuring Point | a | b | c | d | e | f | g | h | i | j | k |
|---|---|---|---|---|---|---|---|---|---|---|---|---|
| Sample 2 | 7-Gray | 1.628 | 2.075 | 1.892 | 2.293 | 1.974 | 2.165 | 2.165 | 2.563 | 2.217 | 2.587 | 2.132 |
|  | 3-Gray | 1.925 | 1.233 | 1.089 | 1.369 | 1.129 | 1.464 | 1.258 | 1.564 | 1.291 | 1.549 | 1.245 |

As seen from Table 1, a brightness difference is generated between the adhesive areas a, c, e, g, i and k and the non-adhesive areas b, d, f, h and l of the TCPs 10c to 10j. In two samples, average brightness differences in the 7 gray pattern and the 3 gray pattern have 0.2691 and 0.1957, respectively. Since a stress applied to the lower glass substrate 3 by the TCPs 10a to 10h becomes larger as the TCPs 10c to 10j become longer or thicker, a brightness difference between the adhesive areas a, c, e, g, i and k and the non-adhesive areas b, d, f, h and l of the TCPs 10c to 10j becomes larger. Therefore, a strategy capable of reducing a brightness difference caused by the TCPs 10c to 10j is required to improve a display quality of the liquid crystal display.

FIG. 6 is a characteristic diagram of a brightness level detected from the liquid crystal panel shown in FIG. 4 with respect to a 7-gray pattern;

FIG. 7 is a characteristic diagram of a brightness level detected from the liquid crystal panel shown in FIG. 4 with respect to a 3-gray pattern;

SUMMARY OF THE INVENTION

Accordingly, it is an object of the present invention to provide a tape carrier package with a dummy bending part that is capable of reducing a brightness difference of the screen.

A further object of the present invention is to provide a liquid crystal display that is adaptive for reducing a brightness difference of the screen.

In order to achieve these and other objects of the invention, a tape carrier package according to one aspect of the present invention includes a pad part connected to a liquid crystal panel; a base film mounted with an integrated circuit chip for applying a signal to the liquid crystal panel; and a dummy bending part for distributing a stress applied to the liquid crystal panel according to a thermal expansion of the pad part by removing the base film between the pad part and the integrated circuit chip.

A tape carrier package according another aspect of the present invention includes a base film mounted with an integrated circuit chip for applying a signal to a liquid crystal panel; a pad part extending from the integrated circuit chip to be connected to the liquid crystal panel; at least one bending part in which the base film at a portion where the tape carrier package is folded is removed; and at least one dummy bending part, in which a desired base film at a portion where the tape carrier package is not folded is removed, for reducing a thermal expansion force and a thermal contraction force of the base film parallel to the longitudinal direction of the integrated circuit chip.

A liquid crystal display device according to still another aspect of the present invention includes a liquid crystal panel; a tape carrier package connected to the liquid crystal panel; a base film mounted with an integrated circuit chip for applying a signal to the liquid crystal panel; at least one bending part in which the base film at a portion where the tape carrier package is folded is removed; a dummy bending part, in which the base film is removed in a direction perpendicular to terminals of the pad part, for reducing a thermal expansion force and a thermal contraction force generated at the time of thermal-pressing the pad onto the liquid crystal panel; and a printed circuit board connected to an input pad part of the tape carrier package.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1A:
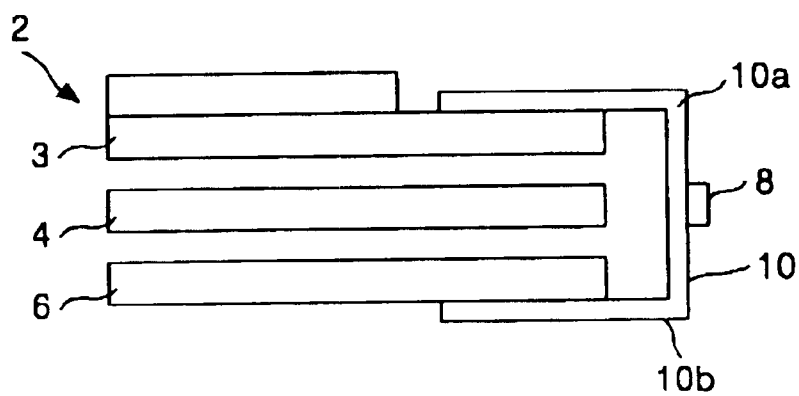
FIG. 1A is a sectional view showing the conventional bending-type tape automated bonding (TAB) system.
Figure 1B:
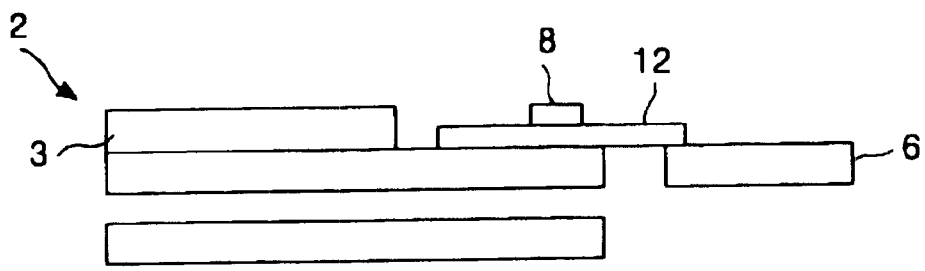
FIG. 1B is a sectional view showing the conventional flat-type tape automated bonding (TAB) system.
Figure 2:
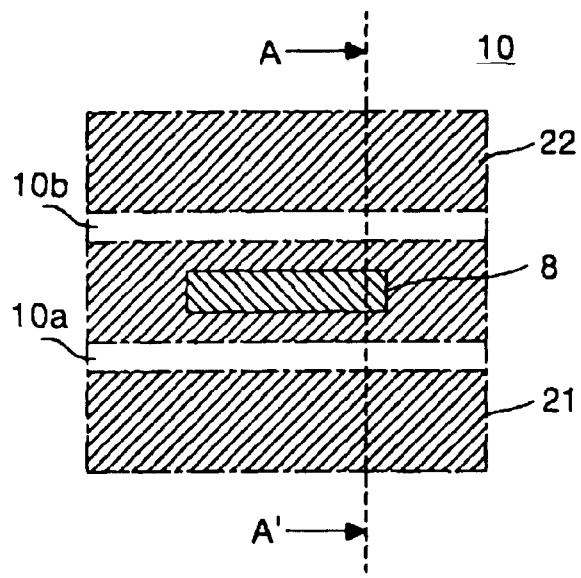
FIG. 2 is a plan view showing the structure of the tape carrier package in FIG. 1A.
Figure 3:
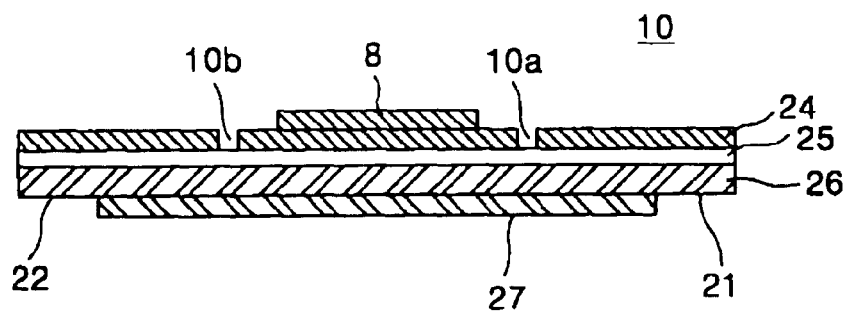
FIG. 3 is a sectional view of the tape carrier package taken along a line A–A' in FIG. 2.
Figure 4:
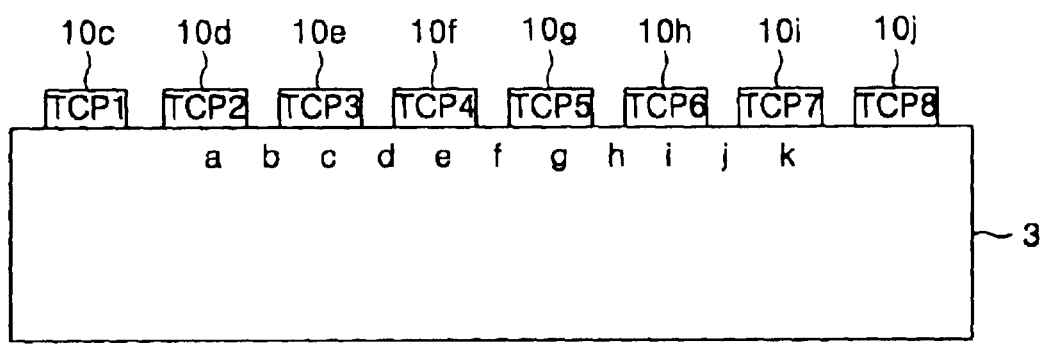
FIG. 4 is a plan view showing the structure of a liquid crystal panel to which tape carrier packages used as a sample for brightness measurement are attached.
Figure 5:
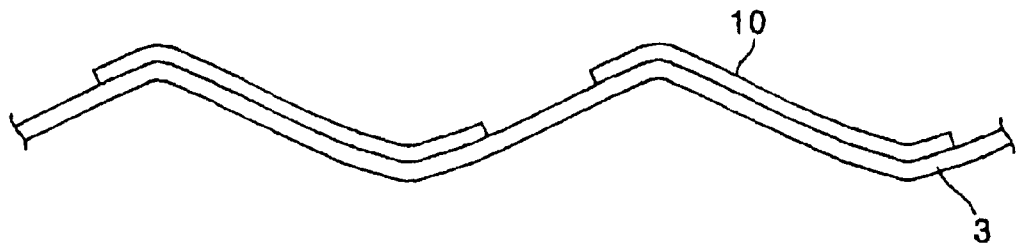
FIG. 5 depicts a deformation of the lower substrate glass substrate caused by the tape carrier package.
Figure 6:
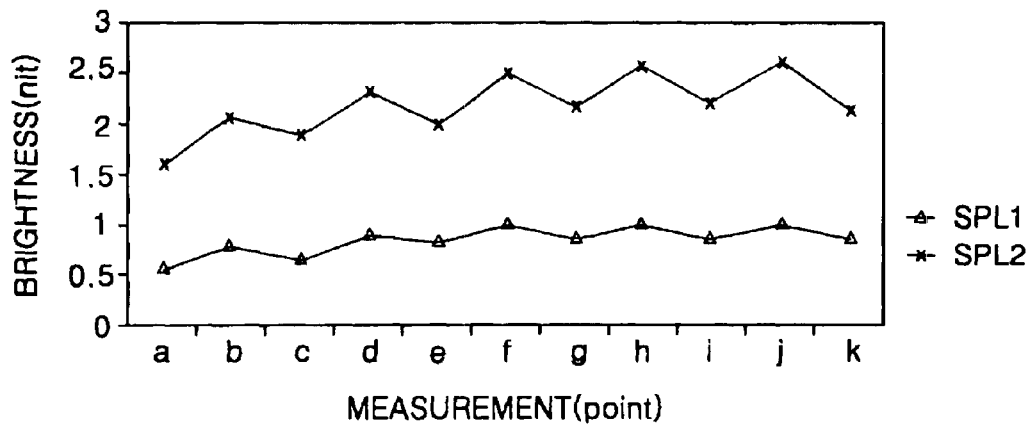
FIG. 6 is a characteristic diagram of a brightness level detected from the liquid crystal panel shown in FIG. 4 with respect to a 7-gray pattern.
Figure 7:
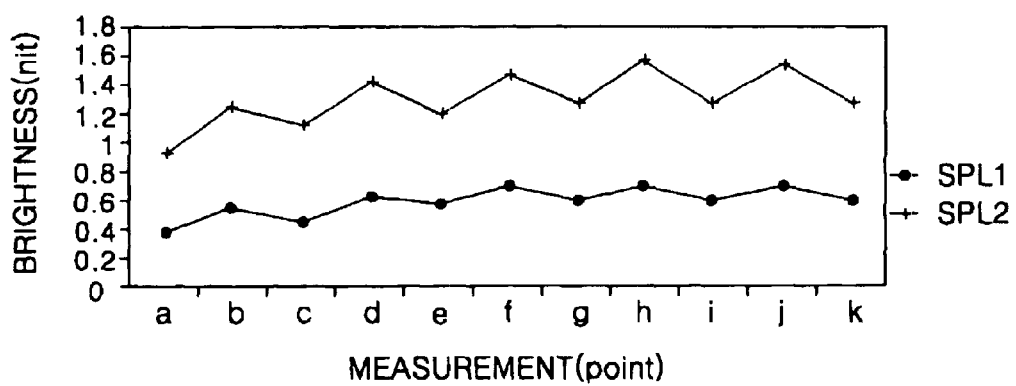
FIG. 7 is a characteristic diagram of a brightness level detected from the liquid crystal panel shown in FIG. 4 with respect to a 3-gray pattern.
Figure 8:
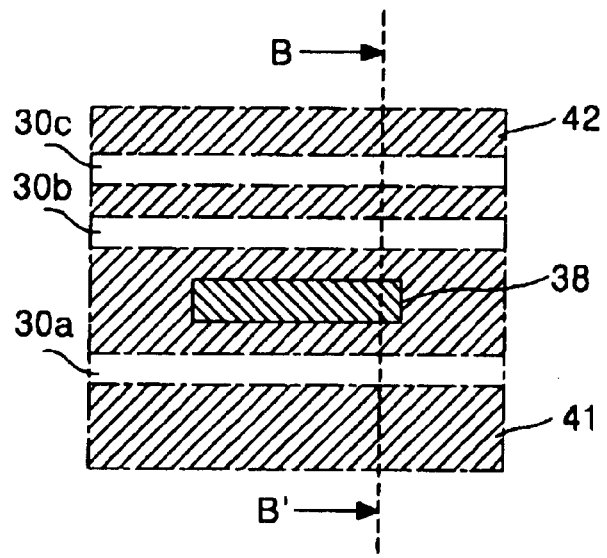
FIG. 8 is a plan view showing the structure of a tape carrier package according to a first embodiment of the present invention.
Figure 9:
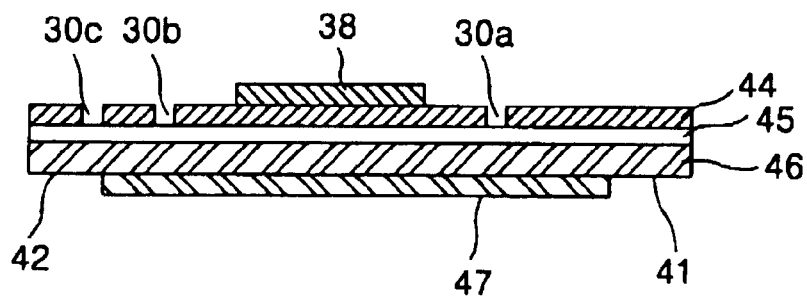
FIG. 9 is a sectional view of the tape carrier package taken along line B–B' in FIG. 8.

Referring to FIG. 8 and FIG. 9, there is shown a tape carrier package (TCP) according to a first embodiment of the present invention, which is applicable to the bending-type TAB system. The TCP includes a D-IC 38 mounted on a base film 44, a first bending part 30*a* provided between an input pad part 41 and the D-IC 38, and a second bending part 30*b* and a dummy bending part 30*c* provided between an output pad part 42 and the D-IC 38 in parallel. The D-IC 38 plays a role to apply scanning signals, or data, to gate lines or data lines of a liquid crystal panel 2. Output pins of the D-IC 38 are connected to a lead part 46 adhered onto the base film 44 by means of an adhesive 45.

The lead part 46 is coated with a solder resistor 47 responsible for providing an insulator. At the input pad part 41 are formed pads extending from the lead part 46 to be connected to an output signal wiring of a PCB 6. Between the input pad part 41 and the D-IC 38 is provided the first bending part 30*a* in which the base film 44 is removed. The TCP between the PCB 6 and the D-IC 38 is easily bent by the first bending part 30*a*. At the output pad part 42 are provided pads extending from the lead part 46 to be connected to pads formed at the edge of the lower glass substrate 3. Between the output pad part 42 and the D-IC 38 is provided the second bending part 30*b* and the dummy bending part 30*c* in which the base film 44 are removed. The TCP between the liquid crystal panel 2 and the D-IC 38 is easily bent by the second bending part 30*b*. The dummy bending part 30*c* reduces the TCP area to which heat is applied at the time of adhering the TCP to the lower glass substrate. Accordingly, since the amount of thermal expansion of the TCP is reduced, the stress applied to the lower glass substrate 3 by the TCP is distributed and thus reduced.

Figure 10:
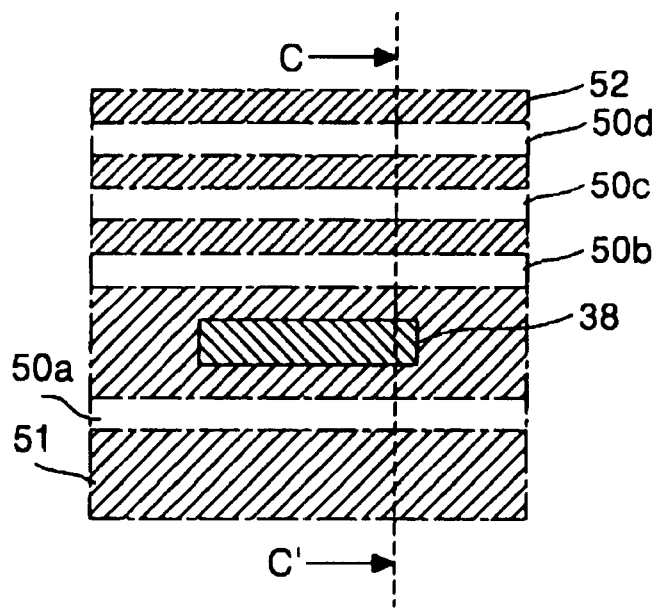
FIG. 10 is a plan view showing the structure of a tape carrier package according to a second embodiment of the present invention.
Figure 11:
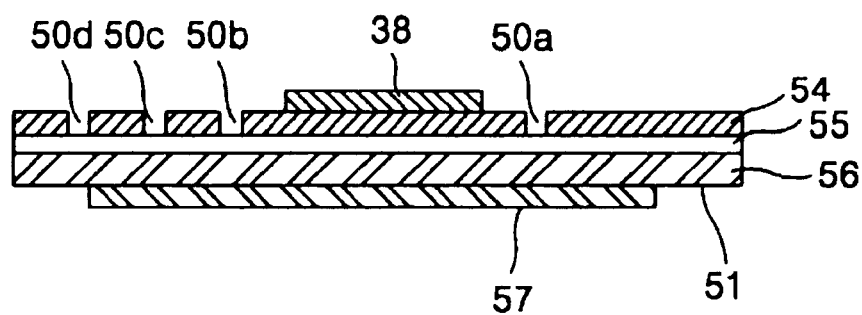
FIG. 11 is a sectional view of the tape carrier package taken along line C–C' in FIG. 10.

Referring to FIG. 10 and FIG. 11, there is shown a tape carrier package (TCP) according to a second embodiment of the present invention, which is applicable to the bending-type TAB system. The TCP includes a D-IC 38 mounted on a base film 54, a first bending part 50*a* provided between an input pad part 51 and the D-IC 38, and a second bending part 50*b*, a first dummy bending part 50*c* and a second dummy bending part 50*d* provided between an output pad part 52 and the D-IC 38 in parallel to each other. At the input pad part 51 are formed pads extending from the lead part 56 to be connected to an output signal wiring of a PCB 6. Between the input pad part 51 and the D-IC 38 is provided the first bending part 50*a* in which the base film 54 is removed. The TCP between the PCB 6 and the D-IC 38 is easily bent with the aid of the first bending part 50*a*. At the output pad part 52 are provided pads extending from the lead part 56 to be connected to pads formed at the edge of the lower glass substrate 3. Between the output pad part 52 and the D-IC 38 are provided the second bending part 50*b*, the first dummy bending part 50*c* and the second dummy bending part 50*d* in which each of the base film 54 is removed. The TCP between the liquid crystal panel 2 and the D-IC 38 is easily bent by the second bending part 50*b*. The first and second dummy bending parts 50*c* and 50*d* play a role to distribute and reduce a stress applied to the lower glass substrate 3 by the TCP. A TCP area to which heat is applied at the time of adhering the TCP onto the lower glass substrate 3 is reduced more than in the TCP of FIG. 8, with the aid of the second dummy bending part 50*d*.

Figure 12:
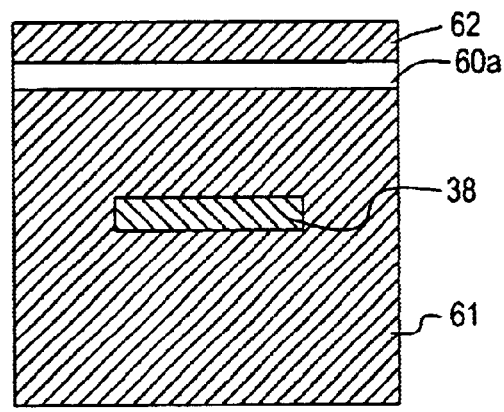
FIG. 12 is a plan view showing the structure of a tape carrier package according to a third embodiment of the present invention.
Figure 13:
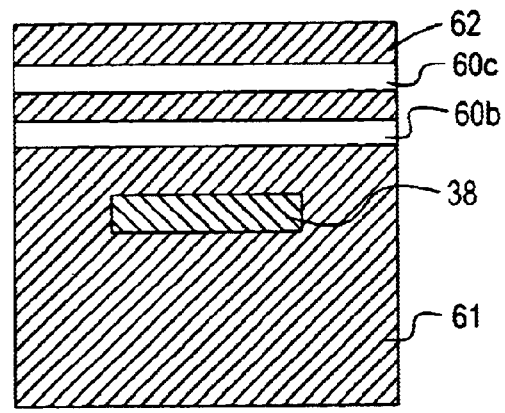
FIG. 13 is a plan view showing the structure of a tape carrier package according to a fourth embodiment of the present invention.

Referring to FIG. 12 and FIG. 13, there are shown tape carrier packages (TCPs) according to other embodiments of the present invention, which are applicable to the flat-type TAB system. Each of the TCPs includes a D-IC 38 mounted on a base film 54, and at least one of dummy bending part 60*a* or 60*b* and 60*c* between an output pad part 62 and the D-IC 38. At the input pad part 61 are formed pads extending from the lead part 56 to be connected to an output signal wiring of a PCB 6. At the output pad part 62 are provided pads extending from the lead part 56 to be connected to pads formed at the edge of the lower glass substrate 3. Between the output pad part 62 and the D-IC 38 are provided one or two dummy bending parts 60*a* or 60*b* and 60*c* in which the base film 54 is removed. The dummy bending parts 60*a*, 60*b* and 60*c* play a role to distribute and reduce a stress applied to the lower glass substrate 3 by the TCP.

As described above, according to the present invention, the base film close to the output pads adhered onto the glass substrate of the liquid crystal panel is removed, so that a stress applied to the glass substrate by the TCP is distributed and thus reduced. As a result, the TCP with dummy bending parts according to the present invention can reduce a brightness difference of the screen. Furthermore, according to the present invention, the TCP having the dummy bending parts is adhered, so that a stress applied to the glass substrate as well as a cell gap difference between the adhesive area and the non-adhesive area of the TCP is reduced to that extent. Accordingly, the liquid crystal display according to the present invention maintains the cell gap constantly at the adhesive area and the non-adhesive area of the TCP, so that it is capable of reducing a brightness difference of the screen.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
   a liquid crystal panel;
   a printed circuit board; and
   a tape carrier package connected to the liquid crystal panel and the printed circuit board, the tape carrier package comprising:
      a base film mounted with an integrated circuit chip for applying a signal to the liquid crystal panel;
      an output pad part extending from the integrated circuit chip and having terminals connected to the liquid crystal panel;
      a dummy bending part in which a portion of the base film is removed in a direction perpendicular to the terminals of the output pad part for reducing a thermal expansion force and a thermal contraction force generated when thermal-pressing the output pad part onto the liquid crystal panel;
      a first bending part in which a second portion of the base film existing at a bent position between the dummy bending part and the integrated circuit chip is removed; and
      an input pad part extending from the integrated circuit chip and having terminals connected to the printed circuit board,
   wherein the dummy bending part is formed at a position, close to any one of the output pad part or the input pad part, where the tape carrier package is not folded.

2. A liquid crystal display device, comprising:
   a liquid crystal panel;
   a printed circuit board; and
   a tape carrier package connected to the liquid crystal panel and the printed circuit board, the tape carrier package comprising:
      a base film mounted with an integrated circuit chip for applying a signal to the liquid crystal panel;

an output pad part extending from the integrated circuit chip and having terminals connected to the liquid crystal panel;

a dummy bending part in which a portion of the base film is removed in a direction perpendicular to the terminals of the output pad part for reducing a thermal expansion force and a thermal contraction force generated when thermal-pressing the output pad part onto the liquid crystal panel;

a first bending part in which a second portion of the base film existing at a bent position between the dummy bending part and the integrated circuit chip is removed;

an input pad part extending from the integrated circuit chip and having terminals connected to the printed circuit board; and a second bending part in which a third portion of the base film existing at a bent position between the input pad part and the integrated circuit chip is removed.

3. The liquid crystal display panel of claim 2, wherein the tape carrier package further comprises a second dummy bending part in which a fourth portion of the base film is removed in a direction perpendicular to the terminals of the output pad part.

4. The liquid crystal display device of claim 1, wherein the tape carrier package further comprises a second dummy bending part in which a third portion of the base film is removed in a direction perpendicular to the terminals of the output pad part.

5. A tape carrier package, comprising:

a pad part for connection to a liquid crystal panel;

a base film mounted with an integrated circuit chip for applying a signal to the liquid crystal panel; and a dummy bending part for distributing a stress applied to the liquid crystal panel according to a thermal expansion of the pad part by removing a portion of the base film between the pad part and the integrated circuit chip, wherein the dummy bending part is formed at a position, close to the pad part, where the tape carrier package is not folded.

6. The tape carrier package according to claim 5, further comprising a first bending part in which a second portion of the base film is removed at a bent position between the dummy bending part and the integrated circuit chip.

7. The tape carrier package according to claim 6, further comprising a second pad part for connection to a printed circuit board.

8. A tape carrier package, comprising:

a pad part for connection to a liquid crystal panel;

a base film mounted with an integrated circuit chip for applying a signal to the liquid crystal panel;

a dummy bending part for distributing a stress applied to the liquid crystal panel according to a thermal expansion of the pad part by removing a portion of the base film between the pad part and the integrated circuit chip;

a first bending part in which a second portion of the base film is removed at a bent position between the dummy bending part and the integrated circuit chip;

a second pad part for connection to a printed circuit board; and a second bending part in which a third portion of the base film is removed at a bent position between the second pad and the integrated circuit chip.

9. The tape carrier package according to claim 5, further comprising a second pad part for connection to a printed circuit board.

10. The tape carrier package according to claim 5, further comprising a second dummy bending part in which a second portion of the base film is removed.

11. The tape carrier package according to claim 10, further comprising a first bending part in which a third portion of the base film is removed at a bent position between the dummy bending part and the integrated circuit chip.

12. The tape carrier package according to claim 11, further comprising a second pad part for connection to a printed circuit board.

13. A tape carrier package, comprising:

a pad part for connection to a liquid crystal panel;

a base film mounted with an integrated circuit chit for applying a signal to the liquid crystal panel;

a dummy bending part for distributing a stress applied to the liquid crystal panel according to a thermal expansion of the pad part by removing a portion of the base film between the pad part and the integrated circuit chip;

a second dummy bending part in which a second portion of the base film is removed;

a first bending part in which a third portion of the base film is removed at a bent position between the dummy bending part and the integrated circuit chip;

a second pad part for connection to a printed circuit board; and a second bending part in which a fourth portion of the base film is removed at a bent position between the second pad and the integrated circuit chip.

14. A tape carrier package, comprising:

a base film mounted with an integrated circuit chip for applying a signal to a liquid crystal panel;

a pad part extending from the integrated circuit chip to be connected to the liquid crystal panel;

at least one bending part in which a portion of the base film is removed at an area where the tape carrier package is folded; and at least one dummy bending part, in which a second portion of the base film is removed at a portion where the tape carrier package is not folded, thereby reducing a thermal expansion force and a thermal contraction force of the base film parallel to a longitudinal direction of the integrated circuit chip.

15. The tape carrier package according to claim 14, wherein said dummy bending part is positioned on the pad part.

* * * * *